3,188,272
ANTIBIOTIC FILIPIN
David Gottlieb and Alfred Ammann, Urbana, Ill., assignors to The University of Illinois Foundation
Filed Nov. 29, 1954, Ser. No. 471,811
7 Claims. (Cl. 167—65)

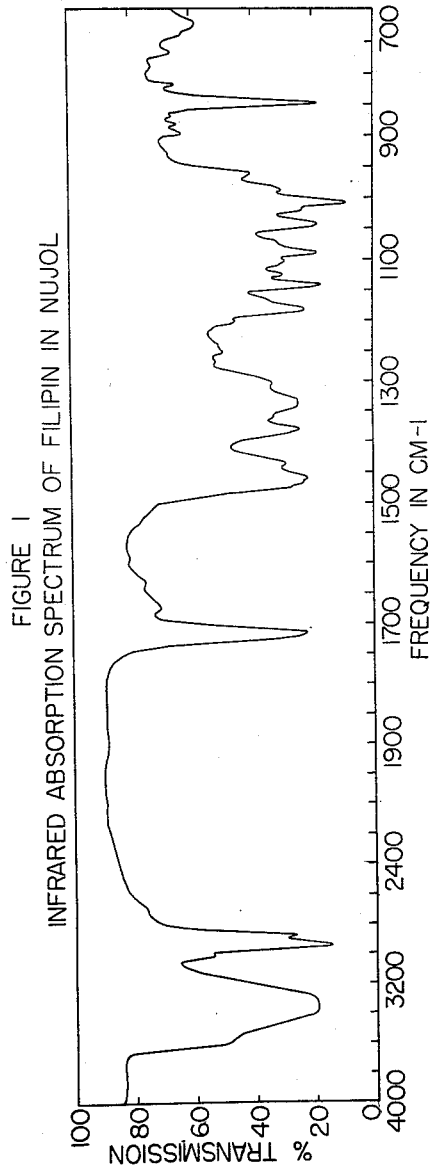

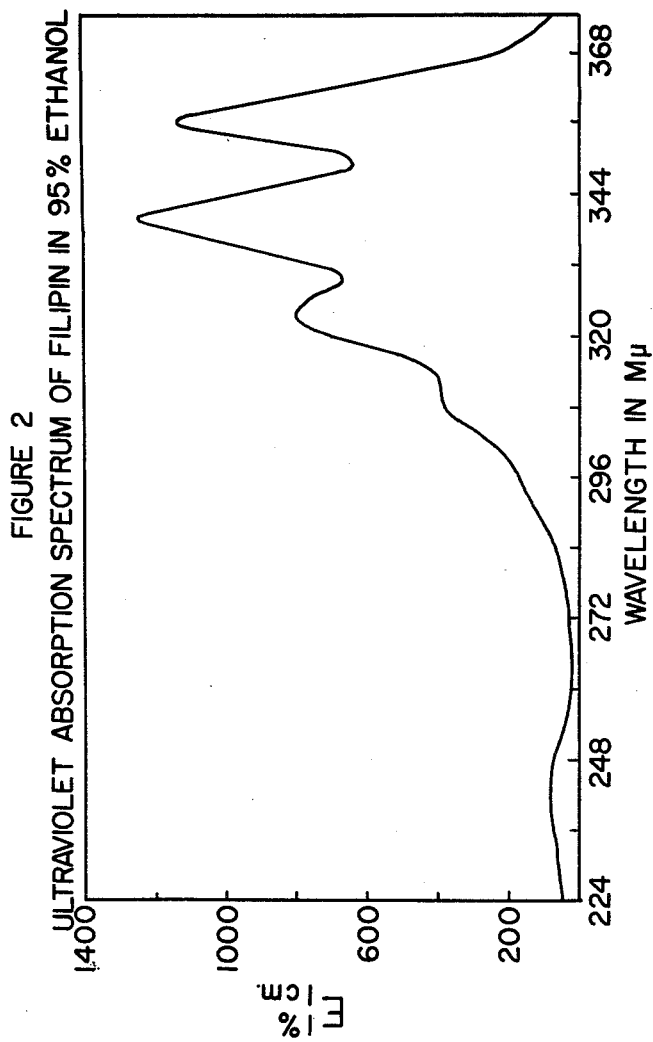

This invention relates to a chemical substance possessing antibiotic activity and to a process for the preparation thereof. More particularly, the invention relates to a novel compound referred to herein by the generic name, filipin, to a process for its production by fermentation, to a method for its recovery and concentration from a crude solution including fermentation broths and to its purification.

It is an object of the present invention to provide a new and useful antibiotic characterized by anti-fungal activity. Another object is to provide a process for the production and recovery of this antibiotic. Other objects and features of the invention will be apparent to those skilled in the art to which this invention pertains.

It has been found that by cultivating, under controlled conditions and on suitable culture media, a hitherto undescribed species of microorganism, Streptomyces filipinensis, isolated from a sample of soil taken in the Philippine Islands, a novel compound, filipin, is obtained. A culture of the living organism has been deposited with the Fermentation Division of the Northern Regional Research Laboratory at Peoria, Illinois, and has been added to its permanent collection as NRRL 2437.

A careful study of the morphology and physiology of S. filipinensis showed it to be distinctly different from any previously described species of streptomyces in Bergey's "Manual of Determinative Bacteriology," 6th Edition, pages 929 to 977 and Waksman and Lechevalier's "Actinomycetes and Their Antibiotics." The microorganism is characterized in Tables I and II. All seeding was done with a vegetative inoculum grown between 26 and 28 degrees centigrade for a period of 48 hours, in 100 milliliters of a 0.5 percent tryptone—0.3 percent yeast extract broth and in a 500 milliliter Erlenmeyer flask on a reciprocal shaker. The inoculum was Waring blended for one minute. 0.1 milliliter of the blended inoculum was added to each test tube or plate. Designations as to color are based on Maerz and Paul, "A Dictionary of Color," 2nd Edition, McGraw-Hill Book Company, 1950.

TABLE I
[Cultural Characteristics of S. filipinensis (incubation at 26–28° C.) [gelatin incubated at 23° C.]]

| Medium | Growth Vegetative | Growth Aerial | Reverse of slant | Soluble pigment | Other |
|---|---|---|---|---|---|
| Plain gelatin stab | + | − | | | Brown | Complete liquefaction. |
| Nutrient gelatin stab | + | − | | | do | Do. |
| Nutrient agar slant | + | − | | | do | None. |
| Nutrient broth | + Ring around surface, flocculent material at bottom. | ± White | | | Tan-brown | Do. |
| d-Glucose broth | do | − | | | do | Do. |
| d-Glucose agar | + | ± Good cottony tan gray-white with rugose vegetative growth at base. | Yellow tan | | Yellow tan | Do. |
| Tryptone broth | + Flocculent material at bottom. | − | | | Tan-brown | Indole test negative. |
| 0.5% tryptone, 0.3% yeast extract broth. | do | ± Very slight aerial growth. | | | Brown | None. |
| Waksman's tyrosine agar | + | ± Gray-tan aerial growth. | Tan | | Trace brown | Slight tyrosinase production. |
| Tyrosine broth (0.1%) | + Flocculent material at bottom. | − | | | do | Do. |
| Litmus milk | + Heavy ring around surface; flocculent material at bottom. | − | | | Red brown | Lactose decomposed. |
| Nutrient nitrate broth | + Ring around surface, flocculent material at bottom. | ± Gray white | | | Tan brown | Nitrate reduction negative. Color with zinc dust-red. |
| Synthetic nitrate broth | do | ± White | | | None | Trace nitrate reduction. Color with zinc dust red. |
| Peptone-iron agar | + | − | Brown | | Brown | H₂S darkening. |
| Bennett's agar | + | + Heavy cottony gray white. | Yellow tan | | Tan | None. |
| Calcium malate agar | + | + White with cream trace of gray. | | | Slight brown | Do. |
| Czapek's sucrose agar | + | + White turning gray | Yellow honey to pink color. | | Yellow to pink | Colorless drops of exudate on mycelium. |
| North's gelatin agar | + | − | | | Brown | Weak to fair liquefaction of gelatin. |
| Asparagine-glycerine agar | + | + White turning gray | | | Yellow | Mycelium shows tendency to grow into medium. |
| Czapek's starch agar | + | + Velvety aerial growth, white turning gray | | | None | Starch hydrolysis weak. |
| Potato plug | + | − | Purple to black | | Purple to black | None. |

+ = growth.  − = no growth.  ± = slight growth.

TABLE II
[Culture Characteristics of S. filipinensis on different Starch Agar Plates (incubation 14 days at 26–28° C.)]

| Medium | Growth Vegetative | Growth Aerial | Reverse of slant | Soluble pigment | Hydrolysis |
|---|---|---|---|---|---|
| Waksman's starch agar A | − | − | − | − | −. |
| Waksman's starch agar B | + | + Slight pink | Pink | − | Positive at 4 days. |
| Nutrient starch agar | + Leathery | − | Tan | Tan | Do. |
| Casein starch agar | + | + Tan pink | Cream | do | Do. |

+=growth.  −=no growth.

Using the procedure of Pridham and Gottlieb, J. Bact. 56, 107–114 (1948), it was found that the following carbon sources supported growth of S. filipinensis on a [1] synthetic medium: xylose, arabinose, fructose, galactose, sucrose, maltose, lactose, raffinose, inulin, mannitol, inositol, sodium acetate, sodium citrate, sodium succinate, dextrose, mannose, starch, dextrin and glycerol.

The culture of S. filipinensis forms a compact substrate mycelium which is light buff in color. The aerial mycelium is first white and then light gray in color as sporulation begins. The sporophores form spirals which vary from an open to a tightly closed spring-like structure. The spores are round to oval in shape. On Emerson's agar slant, the microorganism grows best at 37 degrees centigrade but produces no aerial mycelium. Best production of aerial mycelium occurs at temperatures between 23 and 26 degrees centigrade. No growth occurs at 47 degrees centigrade.

Although S. filipinensis is similar in some respects to S. diastaticus, S. olivochromogenus and S. exfoliatus, it can be distinguished from these microorganisms by marked differences in cultural characteristics which are set forth in Table III.

Submerged, aerobic culture conditions are the conditions of choice for the production of large amounts of filipin. For the preparation of limited amounts of the antibiotic, shake flasks and surface cultures in bottles can be employed. When growth is carried out in large tanks, it is preferable to use the vegetative form of the organism for inoculation of the production tanks to avoid a pronounced lag in the production of the antibiotic and the attendant ineffiecient utilization of the equipment. Accordingly, it is desirable first to produce a vegetative inoculum of the organism by inoculating a relatively small amount of culture medium with the spore form of the organism and when a young, active vegetative inoculum has been secured, to transfer the vegetative inoculum aseptically to large tanks. The medium in which the vegetative inoclulum is produced can be the same as, or different from, that utilized for the production of the antibiotic.

S. filipinensis, NRRL 2437, can be satisfactorily grown at temperatures between about 23 and about 32 degrees centigrade. Optimum yields of filipin are obtained when the culture medium is maintained at a temperature between about 24 and about 28 degrees centigrade.

TABLE III

[Differentiation of S. filipinensis from Identified Streptomyces]

Growth of Test Organism

| Medium | S. filipinensis | Streptomyces diastaticus ATCC 3315 | Streptomyces olivochromogenus NRRL B-1341 | Streptomyces exfoliatus NRRL B-1237 |
|---|---|---|---|---|
| Bennett's agar | Cottony gray-white aerial mycelium; tan pigment on reverse side. | Trace of white aerial growth; light yellow-honey pigment on reverse side. | Trace of white aerial growth; red brown pigment on reverse side. | Pink aerial growth; honey color pigment on reverse side. |
| Czapek's sucrose agar | White aerial mycelium; yellow-honey to pink pigment on reverse side. | Trace of vegetative growth | Trace of vegetative growth | Lavender aerial growth; wine color pigment on reverse side. |
| Maltose tryptone agar | Cottony gray-white aerial mycelium; brown pigment on reverse side. | Same as for Bennett's agar | Same as for Bennett's agar | Lavender white aerial growth; honey color pigment on reverse side. |
| Peptone-iron agar | No aerial growth; brown pigment on reverse side. | Good white aerial growth | do | No aerial growth; no pigment produced. |
| Waksman's tyrosine agar | No aerial growth; trace brown pigment on reverse side. | Trace vegetative growth | Trace vegetative growth | Trace vegetative growth. |
| Casein starch agar | Slight gray white aerial growth; tan pigment on reverse side. | Slight white aerial growth | Trace vegetative growth; slight red brown pigment on reverse side. | Lavender pink aerial growth; honey color pigment on reverse side. |

As noted above, S. filipinensis, NRRL 2437, can be grown in a culture medium to produce an effective antibiotic material. The culture medium can be any one of a number of media as is apparent from the above-described utilization tests. The organism is capable of assimilating many energy sources. However, for economy of production, maximum yield of filipin and ease of isolation thereof, certain culture media are preferable. For example, the presently preferred sources of carbohydrate in the culture medium are sucrose, lactose, cerelose, starch and molasses. Other sources are glycerol, dextril, and the like. Protein sources favorable for the production of antibiotic in good yield are fermentation solubles, cotton seed meal, flour e. g., Kaysoy, (finely ground soy flour obtained from solvent extracted soybeans—manufactured by Archer Daniels Midland Co.), yeast, peptone, soybean meal, and the like.

The nutrient inorganic salts which can be incorporated in the medium include the salts capable of yielding ions such as sodium, potassium, calcium, phosphate, chloride, sulfate, and the like. Inorganic nitrogen sources such as nitrate salts or ammonium salts can aslo be employed.

Essential trace elements can also be included in the culture medium for growing S. filipinensis. Such trace elements are commonly supplied as impurities incidental to the addition of the other constituents of the media.

[1] $(NH_4)_2SO_4$, 2.64 gm.; $KH_2PO_4$, 2.38 gm.; $K_2HPO_4$, 5.65 gm.; $MgSO_4 \cdot 7H_2O$, 1.00 gm.; $CuSO_4 \cdot 5H_2O$, 0.0064 gm.; $FeSO_4 \cdot 7H_2O$, 0.0011 gm.; $MnCl_2 \cdot 4H_2O$, 0.0079 gm.; $ZnSO_4 \cdot 7H_2O$, 0.0015 gm.; agar, 15.00 gm,; distilled water, 1000 ml. pH adjusted to 6.8–7.0. Conc. of carbohydrates and polyhydric alcohols: 1%. Conc. of phenols: 0.01%. Conc. of sodium salts of the organic acids: 0.16%.

Initially, filipin was produced on a small scale by a shake flask fermentation procedure wherein 25 milliliters of a selected medium, in a 125 milliliter Erlenmeyer flask, on a reciprocal shaker (92 strokes per minute; 6.5 centimeter stroke distance), was incubated for three to seven days at a temperature of 26 degrees centigrade. Suitable media included Abbott Complex medium and Kelner and Morton Molasses medium.

The Abbott Complex medium contained the following ingredients:

|  | G. |
|---|---|
| Brown sugar | 10.0 |
| Glycerol | 5.0 |
| Lactose | 5.0 |
| Dextrin | 5.0 |
| Yeast 2019 | 2.0 |
| Fermentation solubles | 5.0 |
| Ammonium nitrate | 2.0 |
| Corn steep liquor | 2.0 |
| Calcium carbonate | 4.0 |
| Sodium chloride | 5.0 |
| Distilled water to 1000 ml. | |

The Kelner and Morton Molasses medium contained the following ingredients:

| Bacto-peptone | g | 5.0 |
|---|---|---|
| Glucose | g | 10.0 |
| Molasses | ml | 20 |
| $FeSO_4 \cdot 7H_2O$ | g | 0.01 |
| Distilled water | ml | 1000 |

The inoculum consisted of an aqueous suspension of a seven day old culture of *Streptomyces filipinensis* (Emerson's agar slant) which had been added to a flask containing Emerson's broth. A two day old shake culture of this medium was then used to inoculate the other flasks. It should be mentioned that the use of the above indicated Abbott Complex and Kelner and Morton Molasses medium are illustrative only as different media were used for the production of the antibiotic on a large scale. Similarly, the aforementioned source of the organism is not controlling inasmuch as it can be obtained also from a soil or lyophilized culture stock.

In general, maximum production of the antibiotic after inoculation of the culture medium occurs between about two and about five days when submerged aerobic cultures are employed, and between about four and about twelve days when surface or shake flask cultures are used.

Filipin is recovered from the culture medium by an extractive procedure involving the use of polar organic solvents such as, for example, dimethylformamide, pyridine, methanol, n-butanol, isopropanol, tertiary butanol, ether, ethyl acetate, amyl acetate, and the like. The solvent extract containing the antibiotic activity is then concentrated to dryness, preferably in vacuo, to yield the antibiotic in crude form.

The antibiotic is isolated from a shake flask fermentation, without adjusting the pH of the culture medium, by the use of solvents such as n-butanol, ether or ethyl acetatae. It can also be extracted with ether at a pH between 2.3 and 10.4 but at the lower pH, the antibiotic appears to be inactivated. Essentially, the mycelium is removed from the fermentation liquor and the clear brew is then extracted with ether and ethyl acetate. The solvent extracts are then concentrated, the antibiotic activity removed, washed with petroleum ether and then dried.

The antibiotic can also be extracted from the mycelium using methanol, ethanol, butanol, or any of the aforementioned polar organic solvents. Preparations of high anti-fungal activity are obtained by extraction of the antibiotic from the mycelium.

Alternatively, filipin can be separated from the culture broth by treatment with an adsorbing agent. Adsorbing agents such as activated alumina, silica gel, magnesium aluminum silicate, and the like, can be used effectively for purification of the antibiotic by adsorption chromatography. Activated carbon can likewise be employed since carbon strongly adsorbs filipin. It is preferable, however, to pre-treat the carbon adsorbent with an agent such as acetic acid, or the like, in order to decrease the strong bonding affinity of the carbon for the antibiotic and therefore facilitate elution of the antibiotic. Elution of the antibiotic from the adsorbent is readily effected by employing a polar organic solvent in which the antibiotic is soluble.

Where an extractive process alone is employed for recovering filipin, a suitable method comprises concentrating the solvent to a relatively small volume and precipitating the antibiotic from the solvent by the addition of a miscible solvent in which the antibiotic is slightly soluble. The antibiotic is then obtained in a crude but solid form.

A preferred method of isolating filipin involves filtering the culture broth at its natural pH, i.e., between about six and about eight, and extracting the filter cake with n-butanol. The extract is then concentrated, and on adding a saturated liquid hydrocarbon having between five and eight carbon atoms, e.g., a Skellysolve solvent, preferably a six or seven carbon hydrocarbon such as hexane or heptane, to the organic extract, an amorphous precipitate is obtained. The precipitate is separated and purified by treatment with chloroform followed by crystallization to obtain the substantially pure antibiotic. On treating the crude amorphous material with chloroform, there is obtained in the chloroform extract, a gummy substance characterized by anti-fungal activity which is distinguishable from filipin by its lack of adsorption in the ultraviolet and a blue-white fluorescence.

The process of the invention is not to be limited to the production of filipin by *S. fiilipinensis* or by organisms fully answering the above description which has been given for illustrative purposes only. It is to be understood that the fermentative processes of this invention also embrace other filipin producing strains of *S. filipinensis*, such strains being readily produced and isolated by routinely applied isolation and strain-modification methods which include selection of cultured organisms and exposure of organisms to modifying means such as X-ray, ultraviolet light and chemical agents such as, for example, nitrogen mustards, and the like.

When *S. filipinensis* is streaked on agar, activity against a wide variety of fungi and yeast is developed. The initial streak of this streptomycete on Emerson's agar was made in Petri dishes and allowed to incubate for seven days at 26 degrees centigrade; it was then "counter-streaked" by the organisms listed in the following table:

TABLE IV

[Streak spectrum of streptomyces filipinensis]

| Test organisms: | Inhibition zone in mm. |
|---|---|
| Candida albicans | 20 |
| Zygosaccharomyces prioranus | 23 |
| Saccharomyces sp. | 23 |
| Verticillium sp. | 24 |
| Penicillium oxalicum | 23 |
| Fusarium lycopersici | 16 |
| Glomerella cingulata | (1) |
| Trichoderma viride | 21 |
| Penicillium chrysogenum | 26 |
| Microsporum canis | 27 |
| Trichophyton interdigitale | 24 |
| Stemphylium solani | 28 |
| Alternaria solani | 26 |
| Helminthosporium turcicum | 26 |
| Aspergillus clavatus | 22 |
| Aspergillus niger | 27 |
| Aspergillus flavus | 16 |

[1] Strong inhibition.

The following table illustrates the inhibitory effect of filipin against various microorganisms.

TABLE V

[Crystalline filipin]

| Organisms: | Concentration in mcg./ml. for complete inhibition |
|---|---|
| Bacilus subtilis Cohn | >100 |
| Sarcina lutea | >100 |
| Escherichia coli | >100 |
| Pseudomonas aeruginosa | >100 |
| Salmonella gallinarum | >100 |
| Alcaligenes faecalis | >100 |
| Mycobacterium tuberculosis 607 | >100 |
| Candida albicans | 2.5–5 |
| Saccharomyces pastorianus | 5 |
| Zygosaccharomyces prioranus | 2.5 |
| Penicilluim oxalicum | 1 |
| Glomerella cingulata | 1 |
| Stemphylium solani | 1–2.5 |
| Penicillium chrysogenum | 2.5 |
| Trichoderma viride | 2.5 |
| Verticillium sp. | 2.5 |
| Alternaria solani | 2.5 |
| Aspergillus niger | 2.5 |
| Aspergilus clavatus | 2.5 |
| Microsporum canis | 2.5 |
| Trichophyton interdigitale | 2.5 |
| Fusarium lycopersici | 10 |
| Aspergillus flavus | 10–50 |

Crystalline filipin was tested against pathogenic fungi at concentrations of 1000.0, 100.0, 10.0 and 1.0 micrograms per milliliter in fungal spectrum agar (dextrose one percent, peptone 0.5 percent, yeast extract 0.1 percent, agar 2.0 percent, distilled water, pH 6.8) in Petri dishes. The test organisms were streaked on the agar surface.

The starting concentration was ten milligrams per milliliter of filipin in 95 percent ethanol. Ethanol controls were run corresponding to the filipin dilutions.

Results are recorded as: CI=complete inhibition, P= partial inhibition, for the lowest concentration of antibiotic or ethanol control inhibiting the test organism. N=no inhibition of test organism at concentrations tested.

Results were recorded after incubation for 48 hours at a temperature of twenty-eight degrees centigrade.

Table VI shows the percent ethanol at concentrations of filipin tested.

Table VII shows results of anti-fungal spectrum.

TABLE VI

[Percent ethanol at concentrations of filipin tested]

| Mcg./ml. filipin: | Percent ethanol |
|---|---|
| 1000.0 | 9.5 |
| 100.0 | 0.95 |
| 10.0 | 0.095 |
| 1.0 | 0.0095 |

TABLE VII

| Test organisms | Mcg./ml. filipin to inhibit test organism | Percent ethanol to inhibit test organism |
|---|---|---|
| Nocardia asteriodes | 1000.0 CI | 9.5% CI, .95% P. |
| Blastomyces dermatitidis | N | N. |
| Coccidioides immitis | 10.0 CI, 1.0 P | 9.5% CI, .95% P. |
| Geotrichum sp | 10.0 CI | 9.5% CI. |
| Hormodendrum compactrum | 10.0 CI | 9.5% CI. |
| Phialophora verrucosa | 10.0 CI | 9.5% CI. |
| Cryptococcus neoformans | 1.0 CI | 9.5% CI. |
| Histoplasma capsulatum | 1000.0 CI | 9.5% CI. |
| Sporotrictum schenckii | 10.0 CI | 9.5% CI. |
| Monosporium apiospermum | 100.0 CI, 10. 0P | 9.5% P. |
| Trichophyton rubrum | N | N. |
| Microsporum audouini | N | 9.5% CI. |
| Candida albicans | 10.0 CI | 9.5% CI. |

Because of its low phyto toxicity, filipin is useful in the treatment of gray leaf spot in tomato plants caused by *Stemphylium solani*. The antibiotic is useful also in the treatment of other plant and fruit diseases caused by fungi which includes black mold in onion plants, corn leaf blight, collar rot in tomtoes, bitter rot in apples, tomato wilt, and the like.

Antibacterial agents, such as cresols, phenol, resorcinol, diphenols, dyes such as gentian violet, fuchsin, methyl violet, and the like, nitrofurazone, and the like, can be used in combination with filipin.

The following examples illustrate the production, recovery, concentration, purification and identification of filipin. These examples are merely illustrative in nature and are not to be construed as limiting.

*Example 1.—Production of filipin and its recovery*

To each of a series of 500-milliliter Erlenmeyer flasks was added 100 milliliters of the following medium:

| | Grams |
|---|---|
| Yeast extract | 1 |
| Beef extract | 4 |
| Bacto-Peptone | 4 |
| Sodium chloride | 2.5 |
| ¹ Cerelose | 10 |
| Distilled water to 1000 cc. | |

¹ Non-technical grade of glucose

The flasks were autoclaved at 121 degrees centigrade for twenty minutes. After cooling, the flasks were inoculated with an aqueous spore suspension obtained from a maltose-tryptone-agar slant (on which *S. filipinensis* was grown) and this was followed by incubation for approximately 72 hours at a temperature of 28 degrees centigrade on a reciprocating shaker. 25 milliliters of this vegetative seed medium was used to inoculate twelve liters of the following sterile medium:

| | Grams |
|---|---|
| Brown sugar | 120 |
| Glycerol | 60 |
| Lactose | 60 |
| Dextrin | 60 |
| Brewer's yeast | 24 |
| Distiller's solubles | 60 |
| Ammonium nitrate | 24 |
| Sodium chloride | 60 |
| Calcium carbonate | 48 |
| Corn steep liquor | 24 |
| Tap water up to 12 liters. | |

The vessel containing the above medium was incubated at a temperature of 26 degrees centigrade, accompanied by stirring, for a 46 hour period.

After the indicated period of time, i.e., 46 hours the twelve liter fermenter inoculum was added to 240 liters of the following sterile medium:

| | Kilograms |
|---|---|
| Cerelose | 4.8 |
| Soybean meal | 2.4 |
| Brewer's yeast | 0.6 |
| Ammonium sulfate | 1.2 |
| Sodium chloride | 0.72 |
| Starch | 2.4 |

Water added to form a volume of 240 liters.

The pH of the above medium was adjusted to 7.20 by the addition of 45 grams of sodium hydroxide and then 0.96 kilogram of calcium carbonate was added. The fermentation was maintained at a temperature of 26 degrees centigrade and agitated by means of a shrouded impeller with a draft tube baffle. The propeller was rotated at the rate of 280 r.p.m. and air was supplied at the rate of 200 standard cubic feet per hour. To minimize foaming, 1100 milliliters of lard oil plus one percent octadecanol, defoamer, was added to the medium. After a ninety hour period, the tank was harvested.

After the indicated period of time, 250 liters of beer was mixed with twenty pounds of a diatomaceous filter aid and the mixture was passed through a plate and frame filter press. The clear filtrate, including the water used in washing the cake, was mixed with ten percent by volume of ethyl acetate and the solution saturated with ethyl acetate was further extracted with sixty liters of ethyl acetate. The spent beer was discarded. The ethyl acetate was removed by distillation, in vacuo, and the residue was extracted with 1.5 liters of Skellysolve B (hexane hydrocarbons). The resulting mixture was filtered, washed with fifty milliliters of Skellysolve B and the amorphous material was dried in vacuo. There was obtained 35 grams of amorphous filipin.

One gram of the amorphous material thus obtained was mixed with 25 milliliters of chloroform, the mixture was centrifuged and the antibiotic in the form of a precipitate was separated from the solvent by filtration. The precipitate was again mixed with twenty milliliters of chloroform, the mixture centrifuged and the precipitate once again separated from the solvent by filtration. The precipitate was washed with two ten-milliliter portions of Skellysolve B and the precipitate was dried in vacuo to obtain crystalline filipin in a 650 milligram yield. The chloroform extracts contained an anti-fungal material which could be distinguished, on the basis of ultraviolet studies, from filipin. The crystalline filipin preparation possessed a potency of 1000 micrograms per milligram. A preparation of this potency was adopted as the standard for the purpose of assay procedure and identification.

Potency of filipin preparations was determined by use of the standard agar diffusion plate assay procedure. The test organisms used were *Pencillium oxalicum* and *Saccharomyces pastorianus* ATCC 2366.

The assay medium was prepared by mixing the following ingredients:

| | Grams |
|---|---|
| Yeast extract | 25 |
| Cerelose | 10 |
| Monobasic potassium phosphate | 1 |
| Agar | 20 | q.s. Water up to 1 liter.

The mixture was autoclaved for twenty minutes at 124 degrees centigrade, cooled to 47 degrees centigrade, inoculated with 0.5 milliliter of a suspension containing about 75,000 cells of *Saccharomyces pastorianus* ATCC 2366 and then a volume of eight milliliters of the inoculated agar medium was poured into each of a series of Petri dishes.

A volume of 0.08 milliliter of a methanolic solution of the preparation to be assayed is pipetted onto a 12.7 millimeter filter paper disc and the disc is then placed in a Petri dish containing the above described agar media. The methanol is allowed to evaporate and the Petri dish is incubated for eighteen hours at thirty degrees centigrade. The diameter of the zone of inhibition is measured. Zone sizes of the standard preparation at various dilutions were plotted against concentration to afford a standard curve from which the concentration of filipin in various preparations could be determined by comparison.

*Example 2.—Production and recovery of filipin*

Spores of *S. filipinensis* obtained from a maltose-tryptone agar slant were used to inoculate six 500-milliliter flasks containing 100 milliliters of the following sterile pre-seed medium:

| | Gram |
|---|---|
| Cerelose | 1 |
| Sodium chloride | .5 |
| Peptone (Difco) | .5 |
| Beef extract | 1 |

Water up to 100 milliliters.

The flasks were shaken on a reciprocating shaker at a temperature of 28 degrees centigrade for 48 hours. The contents of the above indicated flasks were used to inoculate eighty gallons of a sterile medium of the following composition:

| | |
|---|---|
| Brown sugar | 6 lbs. 11 oz. |
| Glycerol | 3 lbs. 6 oz. |
| Lactose | 3 lbs. 6 oz. |
| Dextrin | 3 lbs. 6 oz. |
| Brewer's yeast | 1 lb. 5 oz. |
| Distiller's solubles | 3 lbs. 6 oz. |
| Ammonium nitrate | 1 lb. 5 oz. |
| Sodium chloride | 3 lbs. 6 oz. |
| Calcium carbonate | 2 lbs. 11 oz. |
| Corn steep liquor | 1 lb. 5 oz. |

Water up to 80 gallons.

The tank containing the above indicated seed medium was maintained at a temperature of 28 degrees centigrade for 44 hours. During this time, the fermentation medium was agitated at a rate of 200 r.p.m. and at an air rate of eight standard cubic feet per minute. During the fermentation, foaming was controlled by the addition of 900 milliliters of lard oil containing one percent octadecanol.

After the indicated period of time, i.e., 44 hours, the above fermenter inoculum was added to 1500 gallons of the following sterile medium:

| | |
|---|---|
| Cerelose | 251 lbs. |
| Soybean meal, extracted | 125 lbs. 8 oz. |
| Brewer's yeast | 31 lbs. 8 oz. |
| Ammonium sulfate | 63 lbs. |
| Sodium chloride | 38 lbs. |
| Starch | 125 lbs. 8 oz. |
| Calcium carbonate | 50 lbs. |

Water up to 1500 gallons.

The fermentation was maintained at a temperature of 26 degrees centigrade for a period of 91 hours. Agitation was provided at the rate of 166 r.p.m. and an air rate of eighty standard cubic feet per minute was maintained.

1600 gallons of the beer was mixed with 500 pounds of Dicalite 4200 and the mixture was passed through a plate and frame filter press. The filtrate was discarded and the filter cake was extracted by recycling in approximately three equal portions of a total volume of 170 gallons of n-butanol. The resulting two layer extract was centrifuged in a DeLaval separator to remove the aqueous layer which was then discarded. The clarified butanol layer containing the antibiotic activity was concentrated in a vacuum distillation to approximately ninety liters and was added to 180 liters of Skellysolve B to precipitate the crude antibiotic. The total mass was centrifugally filtered to separate the crude antibiotic from the Skellysolve B-butanol mother liquor. The antibiotic was then washed with ten gallons of Skellysolve B and the solvent was removed by filtration and drying, in vacuo, to obtain a yield of 3304 grams of amorphous filipin assaying 760 micrograms per milligram (standard=1000 micrograms per milligram).

Twenty grams of the amorphous antibiotic was slurried with two 370-milliliter portions of chloroform. The resulting mixture was passed through a sintered glass filter and the precipitate was then washed with ten milliliters of chloroform and two ten-milliliter portions of Skellysolve B. The precipitate was then dried in vacuo. There was obtained seventeen grams of filipin in the form of pale yellow crystals assaying 1000 micrograms per milligram, melting between 195 and 205 degrees centigrade, with decomposition.

Filipin is very soluble in dimethylformamide and pyridine. It is soluble in 95 percent ethanol, methanol, n-butanol, isopropanol, tertiary-butanol, glacial acetic acid, ether, ethyl acetate, and amyl acetate. It is nearly insoluble in water, chloroform, fifty percent ethanol, methylene chloride and Skellysolve B.

Crystalline filipin is stable at 25 degrees centigrade in 95 percent ethanol for three days. At a pH of 11, the antibiotic loses ten percent of its activity, and at a pH of 2, 25 to forty percent of its activity is lost under similar conditions. At eighty degrees centigrade, inactivation is complete within two hours.

The following represents a papergram analysis of filipin:

| Solvent system: | Rf |
|---|---|
| 81% n-butanol in water | 0.85 |
| 81% n-butanol in water +0.25% p-toluenesulfonic acid | 0.85 |
| n-Butanol-acetic acid-water; 2:1:1 | 0.85 |
| 81% n-butanol in water +2% piperidine | 0.85 |
| 96% water, 4% n-butanol | 0.10 |
| 96% water, 4% n-butanol, +0.25% p-toluenesulfonic acid | 0.10 |

Filipin exhibits a specific rotation $[\alpha]_D^{22}$=minus 148.3 degrees (c., 0.89, methanol).

Crystalline filipin exhibits a toxicity $LD_{50}$=seventeen milligram/kilogram, I.P. mice.

The infrared absorption spectrum, FIGURE I, of crystalline filipin in Nujol suspension shows individual bands, expressed in reciprocal centimeters, at about 3580, 3360, characteristic of OH groups. The band at 3360 is strong, that at 3580 is a shoulder. A broad general absorption extends to about 1715, characteristic of a conjugated ester, conjugated or non-conjugated lactone, or a non-conjugated ketone. This shows strong absorption at about 2870 and about 1715. A fairly strong band at 1177 is characteristic of a C—O ester of lactone. The spectrum further shows bands at 1137, 1085, 1040 and 1005 which are probably characteristic of R—OH or R—OR groups. Another strong band at 840 is possibly characteristic of a

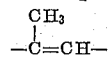

group. An enumeration of all the bands of the antibiotic, as noted in FIGURE 1, is as follows: 3580, 3360, 1715, 1670, 1630, 1435, 1360, 1335, 1302, 1270, 1252, 1240 1203, 1177, 1137, 1124, 1105, 1075, 1040, 1020, 1005, 988, 961, 897, 882, 869, 840, 819, 767, 720.

The infrared absorption spectrum of a five percent weight by volume solution of crystalline filipin in dimethylformamide (using a Perkin-Elmer Spectrophotometer, Model 21, equipped with 0.125 millimeter sodium chloride optics), expressed in reciprocal centimeters, is characterized by the following maxima: 1303, 1160, 1005, 958 and 846.

In the ultra-violet absorption spectrum (FIGURE 2), using a Beckman Quartz Spectrophotometer, Model DU, or a Cary Recording Spectrophotometer, crystalline filipin exhibits, in 95 percent ethanol, maxima at 355 m$\mu$, $k=133$; 338 m$\mu$, $k=136$; 322 m$\mu$, $k=91$; and minima at 328 m$\mu$ and 347, $k=82$.

Filipin has an ultraviolet spectrum typical of a long chain polyene. It contains only carbon, hydrogen and oxygen. An elemental analysis indicates H=8.90%, C=60.95% and O (by difference) =30.15%. Infrared absorption analysis shows no aromaticity. The molecule is neutral and contains no free sugars. The failure of the ultraviolet bands to shift with changes in pH indicates only C=C conjugation.

The polyacetyl and polybenzoyl derivatives are apparently formed (and are characterized by loss of biological activity) but these have only been isolated as oils. It is possible that solid derivatives are obtained from hydrogenated filipin.

A crystalline bromo-derivative of filipin has been obtained which is very unstable. Ultraviolet spectra of this compound show complete loss of the polyene absorption.

When a concentrated (six milligrams per milliliter) solution of filipin in 95 percent ethanol was evaporated under a stream of dry nitrogen at atmospheric pressure, successive crops of a white crystalline degradation product were obtained which was devoid of anti-fungal activity. Elemental analysis indicated C=61.28%; H=8.75% and O (by difference)=29.97%. However, this compound has an ultraviolet absorption spectrum whose intensities are nearly identical to those of filipin but whose maxima are displaced about thirty m$\mu$ toward the shorter wave lengths. The infrared absorption spectrum (Nujol suspension) of this material is nearly identical to that of filipin. A similar result would have been predicted if the polyene chromophore had been shortened by one carbon to carbon double bond. Ultraviolet absorption spectrum of the degradation product indicates maxima at 290 m$\mu$, $k=77$; 303 m$\mu$, $k=117$; and 318 m$\mu$, $k=105$; and minima at 295 m$\mu$, $k=63$ and 311 m$\mu$, $k=57$. The infrared absorption spectrum of this compound in Nujol suspension shows individual bands, expressed in reciprocal centimeters, at about 3590, 3370 and 3170, characteristic of OH groups. A broad general absorption extends to about 1722 and its characteristic of C=O. The spectrum further shows pronounced bands at 1162, 1137, 1095, 1045 and 1005 which probably originate with C=O groups. Additional bands at 849 and 845 are indicative of a

group.

Characterization studies indicated a negative ninhydrin, biuret, Molisch, Benedict, Tollens and ferric chloride test.

It is to be understood that the invention is not to be limited to the exact details of operation or exact compounds shown and described herein, as obvious modifications and equivalents will be apparent to those skilled in the art. The invention is therefore to be limited only by the scope of the appended claims.

We claim:
1. A substance comprising the compound designated as filipin having in its crystalline form the following properties: soluble in dimethylformamide, pyridine, 95 percent ethanol, methanol, n-butanol, isopropanol, tertiary-butanol, glacial acetic acid, ether, ethyl acetate and amyl acetate; containing the elements carbon, hydrogen and oxygen in the following proportions: C=60.95%; H=8.90%; O (by difference)=30.15%; having a melting point between 195 and 205 degrees centigrade, with decomposition; having the following $R_f$ values by papergram analysis:

| Solvent system: | $R_f$ |
|---|---|
| 81% n-butanol in water | 0.85 |
| 81% n-butanol in water 0.25% p-toluenesulfonic acid | 0.85 |
| n-Butanol:acetic acid:water; 2:1:1 | 0.85 |
| 81% n-butanol in water 2% piperidine | 0.85 |
| 96% water, 4% n-butanol | 0.10 |
| 96% water, 4% n-butanol, 0.25% p-toluenesulfonic acid | 0.10 | specific rotation $[\alpha]_D^{22}$=minus 148.3 degrees (c., 0.89, methanol); ultraviolet absorption spectrum maxima (95 percent ethanol) at 355 m$\mu$; 338 m$\mu$; and 322 m$\mu$; exhibiting a characteristic absorption, in the infrared of the spectrum when suspended in Nujol, as shown in FIGURE 1 of the drawing.

2. The product of claim 1 in substantially pure crystalline form.

3. A process for producing filipin which comprises cultivating *Streptomyces filipinensis* NRRL 2437 under aerobic conditions in a culture medium containing a source of assimilable carbon and a source of assimilable nitrogen until substantial antibiotic activity is imparted to said culture medium.

4. A process for producing filipin which comprises cultivating *Streptomyces filipinensis* NRRL 2437 under aerobic conditions in a culture medium containing a source of assimilable carbon and a source of assimilable nitrogen until substantial antibiotic activity is imparted to said culture medium, and recovering filipin from said culture medium.

5. A process for producing filipin which comprises cultivating *Streptomyces filipinensis* NRRL 2437 under aerobic conditions in a culture medium containing a source of assimilable carbon and a source of assimilable nitrogen until substantial antibiotic activity is imparted to said culture medium, and separating filipin from said culture medium by selective extraction with an organic solvent for filipin.

6. Process according to claim 3 in which the culture medium is maintained at a temperature between about 23 and about 32 degrees centigrade and the growth of the organism is carried out for a period of from two to about five days.

7. A process for producing filipin which comprises cultivating *Streptomyces filipinensis* NRRL 2437 under aerobic conditions in a culture medium containing an assimilable source of carbohydrate, an assimilable source of organic nitrogen, and nutrient inorganic salts, maintaining the temperature of the culture medium between about 23 and about 32 degrees centigrade, and carrying out the fermentation for a period of about two to five days and recovering filipin from said culture medium by selective extraction with an organic solvent for filipin.

References Cited by the Examiner

FOREIGN PATENTS 554,991  3/58  Canada.

OTHER REFERENCES

Alexopoulos: Ohio Journal of Science, 1941, pages 425 to 430.

(Other references on following page)

OTHER REFERENCES

Amann et al.: Phytopathology, October 1955, pages 559–563.

Annals of the New York Academy of Sciences, pages 5 and 24, 1948, volume 60, Art 1.

Chicago Telephone Directory 1952, page 568.

Erickson Annual Review of Microbiology, volume III, pages 23–50, 1949, page 50 especially pertinent.

Gottlieb et al.: Phytopathology, January–June 1951, pages 420–429.

Jour. of the Chem. Soc., February 1964, pages 851–854.

Schatz et al.: Mycologia, volume XL, Number 4, pages 461 to 477.

Smith et al.: Antibiotics and Chemotherapy, September 1954, volume 4, Number 4, Number 9, pages 962 to 970. Received for publication, March 29, 1954.

Sneath: J. Gen. Microbiology 1957, volume 17, pages 184–201, pages 185 and 186 are especially pertinent.

Stevenson: Nature, September 25, 1954, pages 598–599.

Tytell et al.: Abstract of Paper No. 108, Presented October 28, 1954 at the Antibiotic Symposium, Washington, D.C.

Waksman: Bacteriological Reviews, volume 21, No. 1, March 1957, pages 1–29.

Waksman: "The Actinomycetes and Their Antibiotics," pages 47, 56, 59, 61, 90, 176 to 178, 180, 181.

Wright: Nature, May 12, 1956, page 896.

Journal of Bacteriology; October 1956, pp. 3–4.

Ball et al.: J. General Microbiology; Aug. 1957, pp. 96–111.

JULIAN S. LEVITT, *Primary Examiner.*

D. ARNOLD, WILLIAM B. KNIGHT, MORRIS O. WOLK, LEWIS GOTTS, *Examiners.*